United States Patent [19]

Hashimoto et al.

[11] 4,451,498

[45] May 29, 1984

[54] METHOD FOR MAKING OXIDE BASED ELECTROCHROMIC DISPLAY DEVICES

[75] Inventors: Eigo Hashimoto, Sakado; Takanori Nanya, Sayama, both of Japan

[73] Assignee: Citizen Watch Co., Ltd., Tokyo, Japan

[21] Appl. No.: 316,823

[22] Filed: Oct. 30, 1981

[30] Foreign Application Priority Data

Nov. 5, 1980 [JP] Japan ............................. 55-155585

[51] Int. Cl.$^3$ ............................................. G02F 1/17
[52] U.S. Cl. ............................. 427/38; 427/126.3; 427/126.5; 427/126.6; 427/255; 427/255.3; 427/255.7; 350/357
[58] Field of Search ............... 427/126.3, 126.5, 126.6, 427/38, 39, 255, 255.3, 255.7; 204/192 N; 350/357

[56] References Cited

U.S. PATENT DOCUMENTS

| | | | |
|---|---|---|---|
| 3,329,601 | 6/1967 | Mattox | 204/298 |
| 4,112,137 | 9/1978 | Zega | 204/192 N |
| 4,116,791 | 9/1978 | Zega | 204/192 N |
| 4,170,662 | 10/1979 | Weiss et al. | 427/38 |
| 4,193,670 | 3/1980 | Giglia et al. | 350/357 |
| 4,258,984 | 3/1981 | Beni et al. | 350/357 |
| 4,340,278 | 7/1982 | Beni et al. | 350/357 |

OTHER PUBLICATIONS

Mattox, J. Vac. Sci. Technol., vol. 10, No. 1, Jan./Feb. 1973, pp. 47-51, *Fundamentals of Ion Plating*.

Howson et al., Thin Solid Films, 58 (1979), 379-384, *Reactive Ion Plating of Metal Oxides onto Insulating Substrates*.

Schiavone et al., Appl. Phys. Lett. 35(10), Nov. 15, 1979, *Electrochromic Iridium Oxide Films Prepared by Reactive Sputtering*.

*Primary Examiner*—James R. Hoffman
*Assistant Examiner*—Richard Bueker
*Attorney, Agent, or Firm*—Koda and Androlia

[57] ABSTRACT

A display device employing an oxide based anodic electrochromic material. By reactive ion plating iridium, rhodium or nickel in an atmosphere including oxygen and water vapor, an anodic electrochromic film exhibiting a good contrast ratio can be obtained. This film can independently be an element of the device. However, a high-performance device is provided by combining the film with a cathodic electrochromic material film. In a complementary device combining the anodic oxide film with the cathodic tungsten oxide film, a contrast ratio of 3.17 and a cyclic life of $10^7$ or more have been obtained.

3 Claims, 8 Drawing Figures

METHOD FOR MAKING OXIDE BASED ELECTROCHROMIC DISPLAY DEVICES

BACKGROUND OF THE INVENTION

This invention relates to electrochromic display devices.

Materials which change from a bleached to a colored state and vice versa as a result of an electrochemical oxidation and reduction are known as electrochromic materials, and display devices utilizing these materials are electrochromic (hereinafter referred to as EC) display devices.

Some EC materials are colored by a reduction reaction, while others are colored by an oxidation reaction; the former are called cathodic EC materials and the latter are called anodic EC materials. As cathodic EC materials, oxides of metals such as tungsten (W), molybdenum (Mo) and titanium (Ti) are known, and, on the other hand, as anodic EC materials, oxides of metals such as iridium (Ir), rhodium (Rh) and nickel (Ni) are known. This invention employs anodic EC materials.

When a metal such as iridium (Ir), rhodium (Rh), nickel (Ni) or the like serving as the anodic EC material is expressed as M, the oxide in the form of MOm (where $m = 1 \sim 3$) hardly exhibits EC characteristics.

In practice, oxides available for EC materials are hydroxides in the form of M(OH)n (where $n = 2 \sim 6$).

Beni et al. have disclosed anodic iridium oxide based EC devices in U.S. Pat. No. 4,191,453. They have anodically oxidized the surface of metal iridium using 0.5 M $H_2SO_4$ as an electrolyte and have obtained an oxide film in the form of Ir(OH)n. This iridium oxide film is transparent but can be converted to a colored state by the following electrochemical reversible change:

Ir(OH)n (transparent)⇌IrOx(OH)n-x (colored) + xH$^+$ + xe$^-$

Further, Beni et al. have shown in U.S. Pat. No. 4,201,454 that the EC characteristics of the iridium oxide layer provided in the process of anodic oxidation can be improved by heat treatment.

Like the iridium, rhodium can be used as the EC material in the anodic oxidation process (see S. Gottesfeld, J. Electrochem. Soc., vol. 127, p. 272, 1980).

The anodic oxidation process is a wet process using a strong acid such as sulfuric acid, and, therefore, the drawback of such process resides in the fact that an electrode film prepared on the surface of a substrate is subjected to chemical attacks.

For instance, a transparent electrode film comprising indium oxide which is excellent in transparency cannot be used because it is corroded by sulfuric acid. Therefore, the selection of electrode films is limited to tin oxide or opaque noble metal films which are inferior in optical characteristic.

Moreover, the EC characteristics of oxide films obtained through the anodic oxidation process depend upon the growth rate of each film, and only oxide films grown at a slow rate for a long time exhibit good EC characteristics. Thus, this is another drawback to the fabrication of EC display devices.

SUMMARY OF THE INVENTION

It is, therefore, one of the objects of the present invention to provide an anodic type oxide based EC material having excellent characteristics without using the anodic oxidation process or wet process.

It is another object of the present invention to form in a short time the aforementioned anodic type oxide based EC material having excellent characteristics.

It is a further object of the present invention to provide a display device with good performance by combining the anodic type oxide based EC material having excellent characteristics with a cathodic type EC material.

To attain the above objects, according to the present invention, an oxide based EC display device comprises one or two substrates at least one of which is transparent, a pair of electrodes at least one of which is formed on the top surface of the substrate by physical vapor deposition and is transparent, an anodic EC material layer formed on the surface of said one of the pair of electrodes by reactive ion plating in an atmosphere including oxygen and water vapor, and an ion permeable insulating layer interposed between the EC material layer and the other of the pair of electrodes. Also, according to the invention, an oxide based EC display device is provided comprising a transparent substrate, a first electrode which is formed on the substrate by physical vapor deposition and which is transparent, a one layer comprising an anodic EC material layer and an ion permeable insulating layer formed on the top surface of the first electrode, another layer comprising an anodic EC material layer and a ion permeable insulating layer formed on the top surface of the one layer, and a second electrode formed on the top surface of the another layer, the anodic EC material layer being formed by reactive ion plating in an atmosphere including oxygen and water vapor. Further, an oxide based EC display device according to the invention also comprises a transparent substrate, a first electrode which is formed on the substrate by physical vapor deposition and which is transparent, a one layer comprising an anodic EC material layer or a cathodic EC material layer formed on the top surface of the first electrode, an ion permeable insulating layer formed on the top surface of the one layer by physical vapor deposition, another layer comprising an anodic EC material layer or a cathodic EC material of the opposite type as in the one layer layer formed on the top surface of the ion permeable insulating layer, and a second electrode formed on the top surface of the another layer by physical vapor deposition, the anodic EC material layer being formed by reactive ion plating in an atmosphere including oxygen and water vapor.

In particular, these arrangements are characterized in that the anodic EC material layer is formed by reactive ion plating of a material selected from the group consisting of iridium, rhodium and nickel in an atmosphere including oxygen and water vapor.

DETAILED DESCRIPTION OF THE INVENTION

One or a plurality of ionization electrodes are placed within an evacuated chamber. When a low-pressure gas is introduced into the chamber and a voltage is applied to the ionization electrode, a gas plasma is produced as a result of a glow discharge. By evaporating materials to be deposited in such atmosphere, the vapor produced is ionized by the gas plasma action and deposited on the surface of a substrate in an activated state. This process is known as ion plating (see, for instance, U.S. Pat. No. 3,329,601).

When the vapor and the introduced gas react and then they are deposited in the form of a compound of the evaporated material and the introduced gas, it is especially called a reactive ion plating. This invention is characterized in that an oxide based EC material film is formed by reactive ion plating in an atmosphere including oxygen and water vapor.

Figure 1:
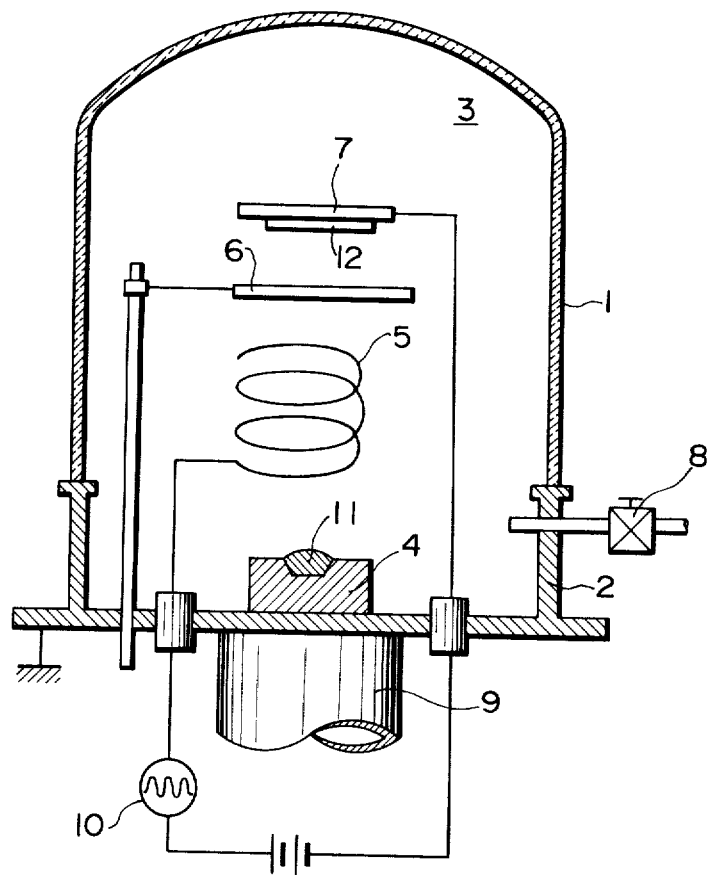
FIG. 1 shows the structure of a radiofrequency (RF) excited ion plating apparatus used in the present invention to form an anodic type oxide based EC material layer.

According to FIG. 1, there is shown the structure of an RF excited ion plating apparatus. An evacuated chamber 3 comprising a bell jar 1 and a base 2 contains an electron beam gun 4 for use as an evaporator, an RF electrode 5 for use as an ionization electrode, a shutter 6 and a substrate holder 7 for carrying a substrate 12. The base 2 is provided with a variable leak valve 8 for introducing gas. Numeral 9 is an evacuating system, 10 is an RF power supply and 11 is a material to be deposited.

Using the apparatus shown in FIG. 1, EC material films based on oxides of Ir, Rh and Ni, respectively have been formed. Referring now to the specific examples, the invention will be explained.

EXAMPLE 1 (Reactive ion plating)

A glass plate coated with $SnO_2$ as a transparent electrode film (hereinafter referred to as "NESA" glass plate) was affixed to the substrate holder 7 as a substrate and then, the chamber 3 was evacuated up to a pressure of $1 \times 10^{-5}$ torr through the evacuating system 9. Next, oxygen gas saturated with water vapor was introduced into the chamber 3 by means of the variable leak valve 8 and the pressure was kept at $1 \times 10^{-3}$ torr. In this state, on applying RF power of 13.56 MHz, 100 watts to the RF electrode 5, a gas plasma was produced in the near vicinity of the RF electrode 5.

In such atmosphere, the metal iridium was evaporated by means of the electron beam gun 4, thus depositing iridium hydroxide of 800 Angstroms in thickness on the surface of the substrate 12 for eight minutes.

For making a comparison, conventional iridium hydroxide films were also formed by reactive sputtering and anode oxidation processes:

(Reactive sputtering)

Within the evacuated chamber in which the oxygen gas saturated with water vapor was introduced at a pressure of $5 \times 10^{-2}$ torr, a water-cooled "NESA" glass plate was used as a substrate and an iridium hydroxide film was formed by RF sputtering. A target comprising metal iridium and the substrate were spaced 10 cm apart and it took about one hour to form a film of 800 Angstroms using 75 W RF power.

(Anode oxidation)

In the same process as described in Shay et al.'s report (see J. L. Shay, G. Beni and L. M. Schiavone, Appl. Phys. Lett. 33 [11], p. 942, 1978), an iridium hydroxide film was formed: An iridium film of 400 Angstroms was evaporated on a "NESA" glass plate and then the film was anodically oxidized in a 0.5 M $H_2SO_4$ solution. After about four hours with the application of a cyclic voltage between $-0.25$ V and 1.25 V versus SCE (saturated calomel electrode) at a speed of 100 mV/sec, the iridium film was substantially converted to a hydroxide iridium film.

Figure 2:
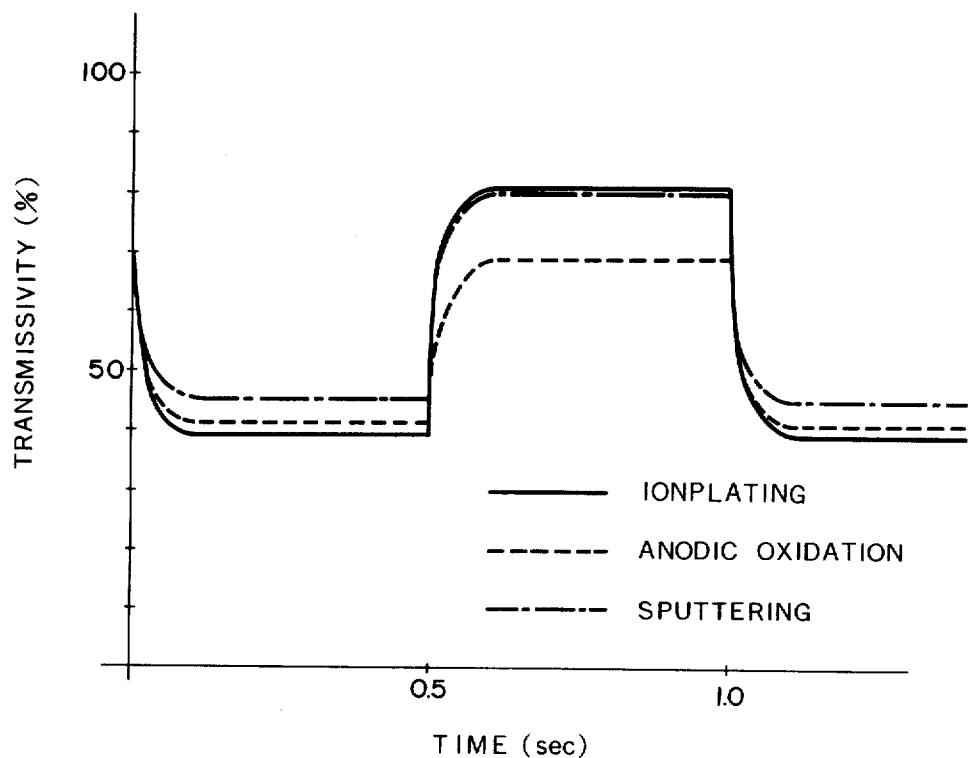
FIG. 2 is a graphical representation comparing the characteristics of an iridium oxide based EC material film formed by reactive ion plating with those of films formed by anodic oxide process and sputtering, respectively.

The EC characteristics of three hydroxide iridium films formed in the three different processes described above are shown in FIG. 2. FIG. 2 shows light transmission variations when the EC films formed on the "NESA" glass plates were immersed together with the counter electrodes in each aqueous solution of 0.5 M $H_2SO_4$ and driven by rectangular pulses of $\pm 1.5$ V, 1 Hz. As a light source a He-Ne gas laser of 633 nanometers in wavelength was used. If light transmission factors at bleaching and coloration states are expressed as Tb and Tc, respectively, and the contract ratio (CR) as Tb/Tc, the result of FIG. 2 is given in the following Table 1:

TABLE 1

|  | Tb | Tc | CR(Tb/Tc) |
|---|---|---|---|
| Reactive Ion Plating | 81% | 39% | 2.08 |
| Reactive Sputtering | 80% | 45% | 1.78 |
| Anodic Oxidation | 69% | 41% | 1.68 |

EXAMPLE 2

Using metallic rhodium as an evaporating material, a hydroxide rhodium film of 800 Angstroms in thickness was formed by reactive ion plating as in Example 1. This film exhibits EC characteristics as shown in Table 2 under the same driving conditions as in Example 1.

EXAMPLE 3

Using metallic nickel as an evaporating material, a hydroxide nickel film of 500 Angstroms in thickness was formed by reaction ion plating as in Example 1. This film exhibits EC characteristics as shown in Table 2 under the same driving conditions as in Example 1.

TABLE 2

|  | Tb | Tc | CR(Tb/Tc) |
|---|---|---|---|
| Rhodium hydroxide | 77% | 40% | 1.93 |
| Nickel hydroxide | 80% | 43% | 1.86 |

EXAMPLE 4

A hydroxide iridium film of 800 Angstroms in thickness was formed by reactive ion plating as in Embodiment 1 and using this film, an EC display device was constructed as shown in FIG. 3: A $SnO_2$ film was formed as a transparent electrode film 32 on one glass substrate 31 by physical vapor deposition such as evaporation, sputtering, ion plating, and the like. Further, an iridium hydroxide film was formed as an EC material film 33 on the surface by reactive ion plating.

Similarly, a $SnO_2$ film was coated as a transparent electrode film 35 on a substrate 34. Then, both the substrates were positioned opposite with a gasket 36 disposed therebetween, and a 0.5 M $H_2SO_4$ solution was injected as an ion permeable insulating layer 37. When ±1.5 V, 1 Hz rectangular pulses were applied between both the electrode films 32 and 35 to drive the display device, a contrast ratio of 1.88 and cyclic life of $10^6$ or more were obtained.

EXAMPLE 5

Figure 3A:
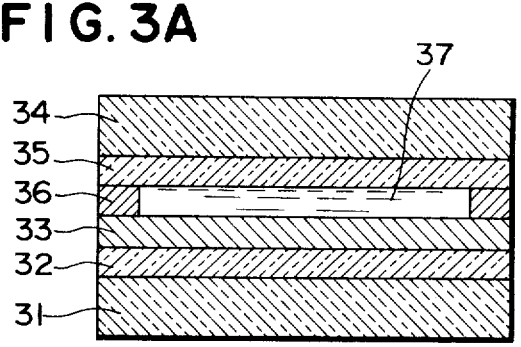
FIGS. 3A, 3B, 4A, 4B, 5A and 5B are cross-sectional views of arrangements of EC display devices, respectively according to the present invention.

Indium oxide ($In_2O_3$) films were formed as transparent electrode films 32 and 35 by physical vapor deposition such as evaporation, sputtering, ion plating and the like, thereby constructing a display device of FIG. 3A as in Example 4. In this case, a high contrast ratio of 2.24 was obtained but the cyclic life was about $10^4$.

EXAMPLE 6

Figure 3B:
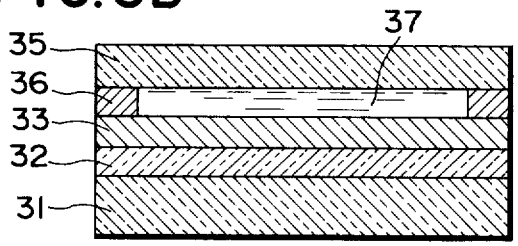

As shown in FIG. 3B, an EC display device comprising a single glass substrate was formed in the same manner as in Example 4: A $SnO_2$ film was formed as a transparent electrode film 32 on a glass substrate 31 by physical vapor deposition. Further, on the surface, a hydroxide iridium film was formed as an EC material film 33 by reactive ion plating. The hydroxide iridium film thus produced and a stainless steel counter electrode plate 35 were positioned opposite through a gasket 36, and a 0.5 M $H_2SO_4$ solution was injected therebetween as an ion permeable insulating layer 37.

EXAMPLE 7

Figure 4A:
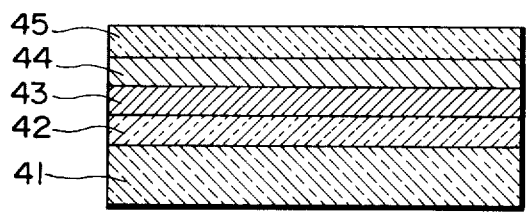

An indium oxide ($IN_2O_3$) film of 1000 Angstroms in thickness was coated as a transparent electrode 42 on a glass substrate 41 by physical vapor deposition. On the surface, a hydroxide iridium film of 800 Angstroms in thickness was formed as an anodic EC material layer 43 as in Example 4 by reactive ion plating. Further, a tantalum oxide ($TA_2O_5$) of 300 Angstroms in thickness was formed thereon as an ion permeable insulating layer 44 by reactive sputtering. Finally, an indium oxide film of 1000 Angstroms in thickness was coated as a counter electrode 45, thereby making an EC display device as shown in FIG. 4A. When applying ±1.5 V, 1 Hz rectangular pulses to drive the device, the contrast ratio ranged from 1.96 to 1.98 and the cyclic life was $10^6$ or more.

EXAMPLE 8

Figure 4B:
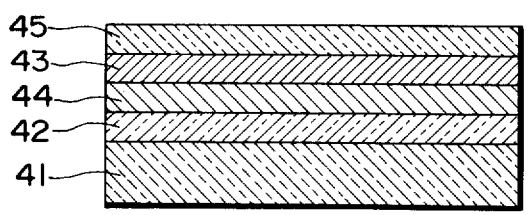

After a transparent electrode 42 was formed on a glass substrate 41 as in Example 7, a tantalum oxide ($Ta_2O_5$) film of 300 Angstroms in thickness was formed as an ion permeable insulating layer 44 by reactive sputtering. Further, on the surface, a hydroxide iridium film of 800 Angstroms in thickness was formed as an anodic EC material layer 43 by reactive ion plating. Then, a counter electrode 45 was coated, thereby making an EC display device as shown in FIG. 4B. Under the same conditions as in Example 6, similar effects have been achieved.

EXAMPLE 9

Figure 5A:
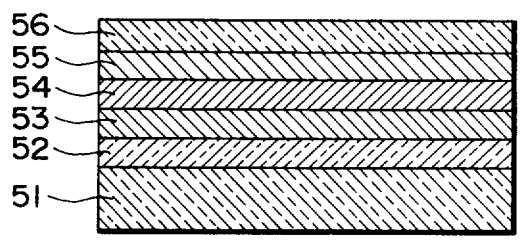

By combining an anodic EC material film with a cathodic EC material film both of which were formed by reactive ion plating, a complementary EC display device has been constructed as shown in FIG. 5A: On a glass substrate 51, an indium oxide ($In_2O_3$) film of 1000 Angstroms in thickness was coated as a transparent electrode film 52 by physical vapor deposition. Further, on the surface, a tungsten oxide ($WO_3$) film of 500 Angstroms in thickness was coated as a cathodic EC material film 53 by reactive ion plating in an atmosphere including oxygen. Moreover, a tantalum oxide ($Ta_2O_5$) film of 300 Angstroms in thickness was coated thereon as an ion permeable insulating layer 54 by reactive sputtering. Then, a hydroxide iridium film of 800 Angstroms in thickness was coated as an anodic EC material layer 55 by reactive ion plating. Finally, an indium oxide film of 1000 Angstroms in thickness was coated as a counter electrode 56 by physical vapor deposition, thus completing a complementary EC display device as shown in FIG. 5A.

In this display device, by the application of a DC voltage between both the electrode films 52 and 56, the following EC reversible reaction is caused:

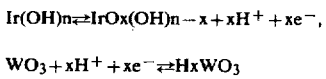

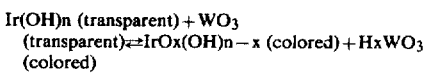

The total is:

$$Ir(OH)n \text{ (transparent)} + WO_3 \text{ (transparent)} \rightleftharpoons IrOx(OH)n-x \text{ (colored)} + H_xWO_3 \text{ (colored)}$$

As shown in the above reaction formula, the anodic EC material and the cathodic material layer interact as being complementing each other. As a result, the color density is increased and the reversible reaction is stabilized. By applying ±1.5 V, 1 Hz rectangular pulses to drive the device, the contrast ratio reached 3.17 and a cyclic life of $10^7$ or more was obtained.

Taking consideration of the fact that when only the tungsten oxide is used as the EC material layer, a voltage of 2.5 V or more is required to drive the device, it should be recognized that according to this invention the responsibility has remarkably been improved by combining with the anodic EC material layer.

When silicon oxide (SiO) or chromium oxide ($Cr_2O_3$) was used as the ion permeable insulating layer and molybdenum oxide ($MoO_3$) or vanadium oxide ($V_2O_5$) was used as the cathodic EC material, the analogous effects were produced.

EXAMPLE 10

Figure 5B:
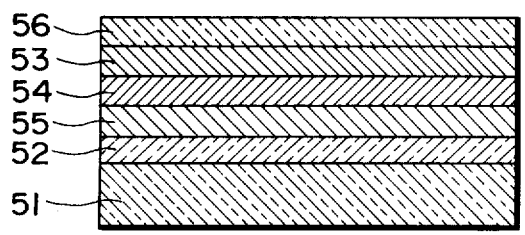

As in Example 9, after a transparent electrode 52 was formed on a glass plate 51, an iridium hydroxide film of 800 Angstroms in thickness was formed thereon as an anodic EC material layer 55 by reactive ion plating. Then, on the surface, a tantalum oxide film of 300 Angstroms in thickness was coated as an ion permeable insulating layer 54 by reaction sputtering. Further, a cathodic EC material layer 55 was formed thereon by reactive ion plating and finally, a counter electrode 56 was formed by physical vapor deposition, thereby making a display device as shown in FIG. 5B. In this case, it has been recognized that the device has characteristics analogous with those of Example 9.

The oxide layer thus formed according to the present invention exhibits excellent characteristics as the anodic type oxide based EC material. The EC material film in a thickness enough to assure a long life can be formed in a relatively short time with good reproducibility.

Since the reactive ion plating used in this invention is a dry process, the elements which have previously been formed on a substrate are hardly deteriorated, thus allowing the transparent electrode, cathodic EC material layer, ion permeable insulating film, anodic EC material layer, counter electrode and the like to be serially deposited on the single substrate.

The EC display devices comprising such layer structure of the invention exhibit excellent performance especially with respect to a response speed, contrast and life.

What is claimed is:

1. A method of manufacturing an oxide based electrochromic display device comprising the steps of:
   forming a pair of electrodes at least one of which is transparent on a pair of substrates at least one of which is transparent by physical vapor deposition in an arrangement in which said pair of electrodes are positioned opposite;
   forming an anodic electrochromic material layer on one of said pair of electrodes by reactive ion plating in which one material selected from the group consisting of iridium, rhodium and nickel is evaporated to produce an oxide and deposit it in an atmosphere including oxygen and water vapor; and
   disposing an ion permeable insulating layer between said electrochromic material layer and the other electrode of said pair of electrodes.

2. A method of manufacturing an oxide based electrochromic display device comprising the ordered steps of:
   forming a first transparent electrode on a transparent substrate by physical vapor deposition;
   forming one layer of an anodic electrochromic material layer and an ion permeable insulating layer on said first transparent electrode;
   forming another layer of anodic electrochromic material layer and ion permeable insulating layer on said one layer; and
   forming a second electrode on the top surface of said another layer by physical vapor deposition;
   said anodic electrochromic material layers being formed by evaporated reactive ion plating in an atmosphere including oxygen and water vapor, and said ion permeable insulating layer being formed by physical vapor deposition.

3. A method of manufacturing an oxide based electrochromic display device comprising the ordered steps of:
   forming a first electrode on a transparent substrate by physical vapor deposition;
   forming one layer of an anodic electrochromic material layer and a cathodic electrochromic material layer on the top surface of said first electrode;
   forming an ion permeable insulating layer on the top surface of said one layer by physcial vapor deposition;
   forming another layer of anodic electrochromic material layer and cathodic material on the top surface of said ion permeable insulating layer; and
   forming a second electrode on the top surface of another layer by physical vapor deposition;
   said anodic electrochromic material layers being formed by evaporated reactive ion plating in an atmosphere including oxygen and water vapor.

* * * * *